(12) United States Patent
Corson et al.

(10) Patent No.: US 7,392,056 B2
(45) Date of Patent: Jun. 24, 2008

(54) METHODS AND APPARATUS FOR UPDATING MOBILE NODE LOCATION INFORMATION

(75) Inventors: M. Scott Corson, Chatham, NJ (US); Rajiv Laroia, Basking Ridge, NJ (US); Vincent Park, Budd Lake, NJ (US); Sathyadev Venkata Uppala, Scotch Plains, NJ (US); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/327,791

(22) Filed: Jan. 6, 2006

(65) Prior Publication Data
US 2006/0112183 A1 May 25, 2006

Related U.S. Application Data

(63) Continuation of application No. 10/640,961, filed on Aug. 13, 2003, now Pat. No. 7,016,690.

(60) Provisional application No. 60/446,327, filed on Feb. 10, 2003.

(51) Int. Cl.
*H04Q 7/20* (2006.01)
(52) U.S. Cl. .................. 455/456.1; 455/410; 455/411
(58) Field of Classification Search .............. 455/456.1, 455/411, 404.2, 414.2, 440, 457
See application file for complete search history.

(56) References Cited

U.S. PATENT DOCUMENTS

| | | | |
|---|---|---|---|
| 5,533,094 | A | 7/1996 | Sanmugam |
| 6,314,282 | B1 | 11/2001 | Weber et al. |
| 6,473,411 | B1 * | 10/2002 | Kumaki et al. ............. 370/331 |
| 6,487,406 | B1 * | 11/2002 | Chang et al. ............. 455/422.1 |
| 6,505,047 | B1 * | 1/2003 | Palkisto ................... 455/456.1 |
| 6,516,193 | B1 * | 2/2003 | Salmela et al. ........... 455/432.3 |
| 6,580,908 | B1 | 6/2003 | Kroll et al. |
| 6,731,621 | B1 * | 5/2004 | Mizutani et al. ............ 370/338 |
| 6,810,259 | B1 * | 10/2004 | Zhang ..................... 455/456.5 |
| 7,016,690 | B2 | 3/2006 | Corson et al. |
| 7,069,000 | B1 | 6/2006 | Corson et al. |

(Continued)

FOREIGN PATENT DOCUMENTS

EP  1 217 855  6/2002

*Primary Examiner*—Joseph Feild
*Assistant Examiner*—Huy D Nguyen
(74) *Attorney, Agent, or Firm*—Straub & Pokotylo; Michael P. Straub; Ronald P. Straub

(57) ABSTRACT

Location update techniques are described. A dormant mobile node updates its location information by sending a first message over a wireless link to an access node. The access node generates a second update message in response to the first message. The second message includes a mobile node identifier and, in some embodiments is directed to the mobile node. The second message is received by a tracking agent, which updates location information corresponding to the mobile node. In the case where second message is an IP message and is routed to the mobile node using Mobile IP, a Mobile IP home agent routes the second message to the mobile node's last point of network attachment where the tracking agent is located and intercepts the message. The tracking agent may send a response message to the access node sending the second message.

31 Claims, 8 Drawing Sheets

U.S. PATENT DOCUMENTS

| | | |
|---|---|---|
| 7,206,781 B2 | 4/2007 | Miyamoto et al. |
| 2002/0012433 A1* | 1/2002 | Haverinen et al. .......... 380/247 |
| 2002/0173303 A1* | 11/2002 | Shibutani .................... 455/426 |
| 2003/0003950 A1 | 1/2003 | Kroll et al. |
| 2003/0039234 A1 | 2/2003 | Sharma et al. |
| 2003/0050040 A1 | 3/2003 | Yamazaki et al. |
| 2003/0087629 A1 | 5/2003 | Juitt et al. |
| 2003/0220095 A1 | 11/2003 | Engelhart |
| 2004/0053613 A1 | 3/2004 | Karaoguz et al. |
| 2004/0192309 A1 | 9/2004 | Watanabe et al. |
| 2004/0198311 A1 | 10/2004 | Aerrabotu et al. |
| 2004/0203894 A1* | 10/2004 | Watanabe et al. ......... 455/456.1 |
| 2004/0203923 A1 | 10/2004 | Mullen |

* cited by examiner

METHODS AND APPARATUS FOR UPDATING MOBILE NODE LOCATION INFORMATION

RELATED APPLICATIONS

The present application is a continuation of U.S. patent application Ser. No. 10/640,961, filed on Aug. 13, 2003 now U.S. Pat. No. 7,016,690 and titled "METHODS AND APPARATUS FOR UPDATING MOBILE NODE LOCATION INFORMATION", which claims the benefit of U.S. Provisional Patent Application Ser. No. 60/446,327, filed Feb. 10, 2003 titled "METHODS AND APPARATUS FOR LOCATION TRACKING AND PAGING OF MOBILE DEVICES IN WIRELESS COMMUNICATION NETWORKS", each of these applications is hereby expressly incorporated by reference.

FIELD OF THE INVENTION

This invention relates to communications system and, more particularly, to methods and apparatus for location tracking and paging in a wireless, e.g., cellular, communication networks.

BACKGROUND

In a typical cellular communication network, a set of geographically dispersed base stations provide wireless access to a communications infrastructure. Users with wireless communication devices, or terminals, are able to establish a direct communication link with a suitable base station and then exchange information with other users and/or end systems throughout the communication network. In general, such systems could support a variety of different applications (e.g., telephony, text messaging, streaming audio/video, web browsing, file transfer, etc.); however, traditional systems have been primarily designed for telephony. The information exchanged over the access link includes user data as well as control signaling to support the access link itself, coordinate transmissions, enable mobility, and provide many other such features.

Typically, users of a cellular communication system are not continuously engaged in active information exchange (e.g., there may be significant periods during which the end user is not participating in a communication session). A location tracking and paging system allows the wireless terminal, during periods of inactivity, to transition into a dormant mode to reduce power consumption and maximize operational lifetime, while still maintaining inbound reachability. While operating in a dormant mode, a wireless terminal may still periodically monitor a special paging channel to enable the establishment of incoming communication sessions. Thus, the user of the wireless terminal may still receive calls. However, page signaling to alert a dormant wireless terminal of an incoming communication session is typically limited to a location area (or paging area) comprising a subset of base stations in geographic proximity to where the wireless terminal transitioned into the dormant mode or last reported its location. Thus, as a dormant wireless terminal migrates (e.g., changes cells or location/paging areas), additional control signaling is often used to update the location information (e.g., location/paging area) associated with the dormant wireless terminal. Depending on the system design, location update signaling may be performed periodically and/or upon certain events such as crossing cell or location/paging area boundary.

There is an engineering tradeoff regarding the accuracy of location tracking information. Maintaining accurate location tracking information requires more frequent location update signaling, thus increasing communication overhead and wireless terminal power consumption while in a dormant mode. Alternatively, with less accurate location information, page signaling may need to extend throughout a larger subset of base stations, thus increasing communication overhead associated with returning the wireless terminal to an active mode. Furthermore, depending on the paging strategy, less accurate location information also typically results in an increase in paging latency.

Traditional, circuit-switched, cellular networks designed primarily for voice telephony often employ relatively large location/paging areas consisting of tens or even hundreds of base stations. In such systems, dormant wireless terminals are free to move around the corresponding geographical area without being required to send location update signaling. The disadvantage of this approach is that when a dormant wireless terminal needs to be paged, many and possibly all of the base stations in the location/paging area participate in signaling the wireless terminal.

Circuit-switched, cellular network technology is presently being extended to support data applications. Additionally, there are emerging packet-switched cellular network technologies, which are better suited for supporting a wide range of applications, including interactive data applications like instant messaging and online gaming. A wireless terminal that supports a wider range of applications, particularly more interactive and transactional applications, is likely to more frequently transition between active and dormant modes; thus, there will likely be a significant increase in the frequency of paging attempts. This suggests the benefit of supporting smaller location/paging areas, which, as detailed above, may in turn require frequent location update signaling. Thus, there is a need for lightweight location update and paging mechanisms to enable a reduction in location/paging area size without overly increasing communication overhead or increasing power consumption (reducing operational lifetime).

In view of the above discussion, it is apparent that there is a need for improved methods and apparatus for location tracking and paging.

SUMMARY OF THE INVENTION

Figure 1:
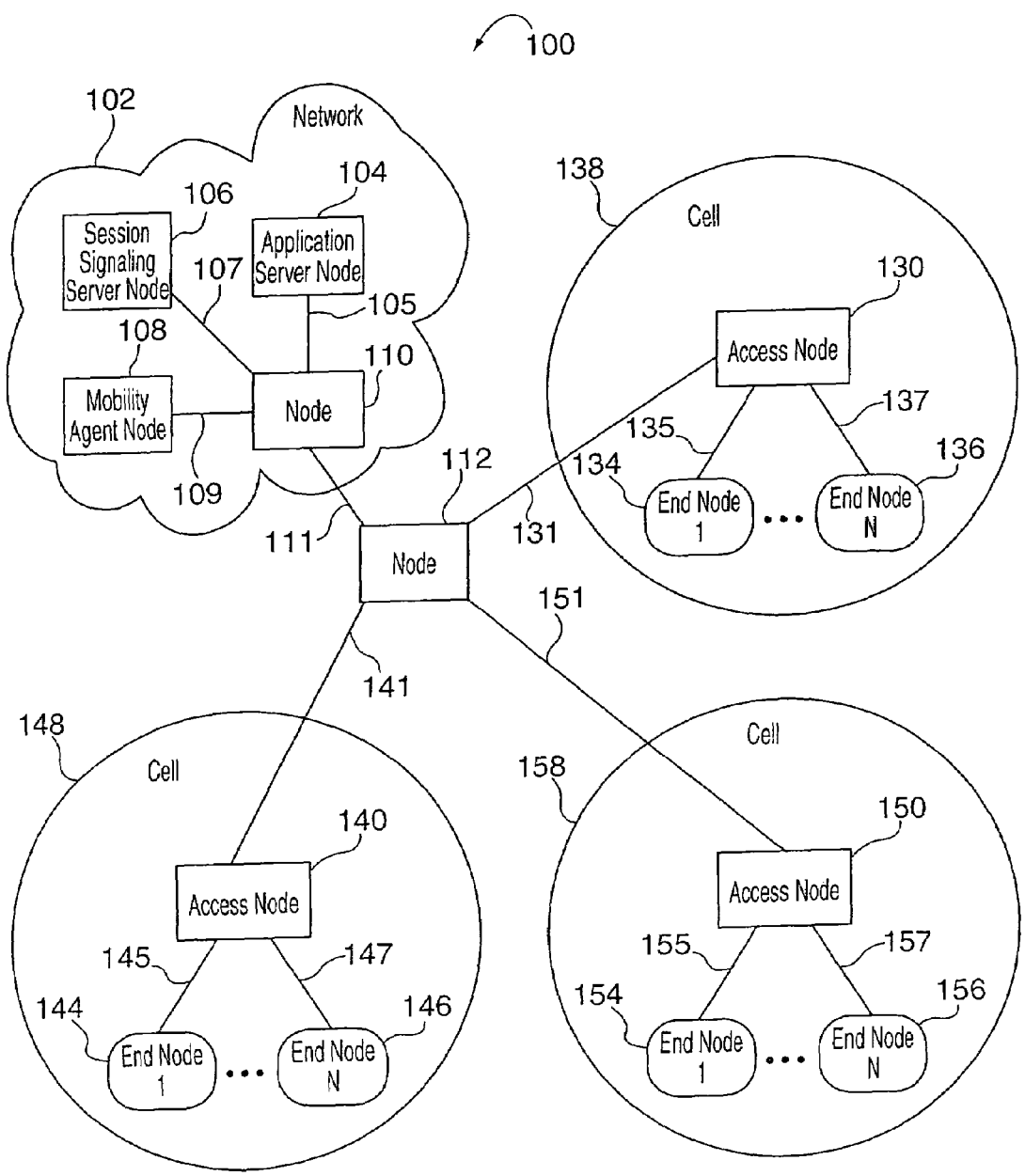
FIG. 1 illustrates a network diagram of an exemplary communications system of the present invention.

Efficient signaling, e.g., messaging, suitable for a range of applications including location tracking and paging for dormant mobile nodes/wireless terminals is described. Methods and apparatus for providing security with regard to signaling sent over a wireless communications link to an access node are also described. The signaling and security techniques of the present invention are particularly well suited for use with regard to location update signals, e.g., messages, but may be used for a wide variety of signaling applications, e.g. signaling session-layer presence information for dormant mobile nodes/wireless terminals.

In one embodiment, location update signals, e.g., messages, are transmitted from a mobile node, wireless terminal or other device with a wireless interface, to an access node. To keep their size small the exemplary location update signals may include simply a mobile node identifier. In some embodiments, for security reasons, an authenticator is included in the signal along with the mobile node identifier. The signals may be sent using predetermined time slots, frequencies, etc. In this way, an access node can determine from the time slot, frequency or another signal attribute that the signal is a location update, rather than making the determination from the signal format, e.g., message header, which increases its size. Signal attribute information can also be used to implicitly convey information about the input to a one-way hash function which was used to generate an authenticator transmitted as part of the location update signal.

In accordance with one particular embodiment, in response to receiving a location update signal, e.g., message, the access node receiving the signal generates a second signal, e.g., a second location update message, which includes at least some information from the received signal such as the mobile node/wireless terminal identifier and/or authenticator included in the received signal. Additional information such as location information and/or access node identification information may also be included in the second signal.

In some embodiments, the access node also includes in the second signal, e.g., message, information known to the access node that was used as the input to a hash function in the mobile node/wireless terminal which transmitted the received location update signal. This information may be known to the access node, e.g., it may be signal timing information, an access node identifier and/or other information determined from an attribute of the received signal. Advantageously, since the information is known to the access node it need not be explicitly transmitted by the mobile node/wireless terminal to the access node as part of the signal. However, to facilitate authentication by an entity other than the access node, the known information is added to the second signal, e.g., location update message, so that it will be available for use by an entity receiving the second signal.

The second signal, e.g., the location update message generated by the access node, is, in some embodiments, directed and/or addressed to the mobile node/wireless terminal which transmitted the received location update signal. This technique is particularly well suited for communication systems where Mobile IP supports forwarding of IP messages to a mobile node's last known location. In one such embodiment, a location tracking agent is located in each access node. When a dormant mobile node hands off from one access node to another e.g., as part of moving from one cell to another, or at periodic intervals, it sends a location update signal to the new access node. A second location update signal is generated by the new access node and directed to the mobile node. The second location update signal may be an IP message and be forward by normal Mobile IP routing to the mobile node's last known location or Mobile IP foreign agent, e.g., the access node from which the mobile node transitioned into a dormant mode. A Mobile IP home agent located along the network path of the IP messages directed to the mobile node which sent the first location update signal is, in some cases, responsible for directing the second location update message to the access node where the mobile node was last located, e.g. a Mobile IP foreign agent, and thus to the tracking agent included therein.

In various embodiments a tracking agent receiving a location update signal, e.g., message, uses the mobile node/wireless terminal identifier and other information included in the second location update signal, along with a local secure key associated with the identified mobile node/wireless terminal, to generate a second authenticator. The second authenticator is compared to the first authenticator received form the mobile node/wireless terminal as part of a security operation. If the first and second authenticators match, the signal, e.g., message, is deemed to have been authenticated and location information corresponding to the identified mobile node/wireless terminal is updated. If a match is not detected, an authentication failure is declared and the location information is not altered or is altered in a manner to reflect the reception of a location update that failed the authentication check.

The tracking agent may keep count of the number of failed authentication operations and/or the rate of message authentication failures for each mobile node/wireless terminal and initiate a security operation when the rate of authentication failures exceeds some preselected rate.

The tracking agent, in various embodiments, sends a location update response signal, e.g., message, to the access node which sent it the second location update signal. The location update response signal may be routed over a different path than the second location update signal, e.g., it may be forwarded directly to the access node which sent the second location signal without being routed through the mobile node's Home Agent. The location update response signal often includes an indication as to whether or not there was an authentication failure. The access node receiving location update response signals may keep track of the rate of reported authentication failures and initiate a security operation if the rate exceeds some preselected threshold. Since the access node receives location update response signals, e.g., messages, corresponding to multiple mobile nodes/wireless terminals which are communicating through the access node, the access node can detect the presence of a malicious mobile node/wireless terminal transmitting multiple location update signals with different identifiers. Such a security attack might go unnoticed by the tracking agent since each attempted security breach might correspond to a different identified mobile node/wireless terminal thereby preventing a failure counter or rate measurement at the tracking agent associated with an individual mobile node/wireless terminal exceeding a threshold set in the tracking agent. By using the failure thresholds in both the tracking agent and the access node which transmits the location update signals, a relatively good level of security can be provided against various security attacks.

Location update signals, e.g., messages, and their novel format may be used alone or in combination with the various security features of the present invention. Thus, while described in the exemplary context of a location update signal, e.g., message, the security features of the present invention can be used with other types of signals, e.g., messages. The signal security technique of the present invention is particularly well suited where communications bandwidth is limited since short authenticators can be transmitted, e.g., in wireless applications while still maintaining a useful level of security. In such cases the access node supplies to the entity ultimately performing the authentication check some of the information which was used by the wireless terminal to generate the authenticator without the need for such information to be transmitted over the wireless communications link in an explicit manner. The information that is known to both the access node and the wireless terminal that is used in generating the authenticator may be, and in some embodiments is, determined by a signal, e.g., message, attribute such as frequency and/or transmission time of the signal, e.g., message, transmitted over a wireless link to an access node. Such information while readily available to the access node and wireless terminal may not be easy to determine from simply monitoring the communications channel since the known information may be some number or value generated in a predetermined manner from the signal, e.g., message, attribute.

Thus, the present invention provides both novel location update methods and apparatus. It also provides signal, e.g., message, security features and techniques which are particularly well suited for wireless applications. Numerous additional features, benefits and applications of the methods and apparatus of the present invention are discussed in the detailed description which follows.

DETAILED DESCRIPTION OF THE FIGURES AND THE INVENTION

FIG. 1 illustrates an exemplary communication system 100, e.g., a cellular communication network, which comprises a plurality of nodes interconnected by communications links. Nodes in the exemplary communication system 100 may exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 134, 136, 144, 146, 154, 156, which access the communication system via a plurality of access nodes 130, 140, 150. The end nodes 134, 136, 144, 146, 154, 156 may be, e.g., wireless communication devices or terminals, and the access nodes 130, 140, 150 may be, e.g., wireless access routers or base stations. The exemplary communication system 100 also includes a number of other nodes as may be needed to provide interconnectivity or to provide specific services or functions. Specifically, the exemplary communication system 100 includes a mobility agent node 108, e.g., Mobile IP home agent node, as may be needed to support mobility of end nodes between access nodes, a session signaling server node 106, e.g., Session Initiation Protocol (SIP) proxy server, as may be needed to support establishment and maintenance of communication sessions between end nodes, and an application server node 104, e.g., multimedia server, as may be needed to support specific application layer services.

The FIG. 1 exemplary system 100 depicts a network 102 that includes the application server node 104, the session signaling server node 106, and the mobility agent node 108, each of which is connected to an intermediate network node 110 by a corresponding network link 105, 107, 109, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 130, 140, 150 via network links 131, 141, 151, respectively.

Each access node 130, 140, 150 is depicted as providing connectivity to a plurality of N end nodes (134, 136), (144, 146), (154, 156), respectively, via corresponding access links (135, 137), (145, 147), (155, 157), respectively. In the exemplary communication system 100, each access node 130, 140, 150 is depicted as using wireless technology, e.g., wireless access links, to provide access. A radio coverage area, e.g., communications cell, 138, 148, 158 of each access node 130, 140, 150, respectively, is illustrated as a circle surrounding the corresponding access node.

The exemplary communication system 100 is subsequently used as a basis for the description of an embodiment of the invention. Alternative embodiments of the invention include various network topologies, where the number and type of network nodes, the number and type of links, and the interconnectivity between nodes may differ from that of the exemplary communication system 100 depicted in FIG. 1.

In accordance with the present invention, support for location tracking and paging of end nodes in the exemplary system 100 is enabled by the following functional entities which may be implemented, e.g., in one or more modules.

1. Monitoring Agent (MA): The MA receives and filters incoming signals, e.g., messages, for a dormant end node and determines if paging should be initiated for the end node.
2. Tracking Agent (TA): The TA receives location update signals, e.g., messages, to track a dormant end node's location, e.g., current location/paging area, access node, cell and/or sector. The frequency of location updates and accuracy of location tracking information maintained by the TA is implementation dependent.
3. Anchor Paging Agent (APA): The APA coordinates page signaling, e.g., sends page request messages, for a dormant end node. Typically the APA initiates page signaling in response to a trigger signal from the MA, and directs page signals to other network nodes, e.g., access nodes, based on tracking information maintained by the TA.
4. Local Paging Agent (LPA): The LPA coordinates signaling between a dormant end node and other functional entities, e.g., TA and/or APA, which may be located elsewhere in the communication system. The LPA includes a paging agent that controls page signaling and a location update agent that controls location tracking signaling, e.g., location update signaling. The paging agent and location update agent may be implemented as separate entities, e.g., modules, or combined into a single entity, e.g., module, that implements both functions. Herein, the term LPA is use to refer to the case where both the paging agent and location update agent functions are combined into a single entity.

In various embodiments of the present invention some of these functional entities may be omitted or combined. The location or placement of these functional entities in the network may also be varied in different embodiments.

In general, the MA, TA, and APA functionalities are closely related and collectively maintain state information on dormant end nodes to enable location tracking and paging. Thus, these three functions may often be collocated within the same node or in nodes that are topologically in close proximity to one another. In traditional system designs, equivalent functions are typically centrally located in the core of the network infrastructure. The present invention supports this centralized design, but also supports a more distributed design in which these functions are located at the edge of the network infrastructure, e.g., in the access nodes. Unlike the MA/TA/APA, the LPA function is more stateless in nature. The LPA essentially serves to coordinate signaling between the end node in its present location, e.g., its current location/paging area, access node, cell, and/or sector, and the MA/TA/APA that is supporting the dormant end node, which may be located elsewhere in the network. Thus, the LPA function is typically distributed and located at the edge of the network infrastructure, e.g., in the access nodes. In various embodiments of the present invention, a single LPA may support a plurality of access nodes/cells/sectors, defined to be within the local scope of the LPA. The following describes an exemplary embodiment of the present invention in which the MA, TA, APA and LPA functions are all collocated in the access nodes.

Figure 2:
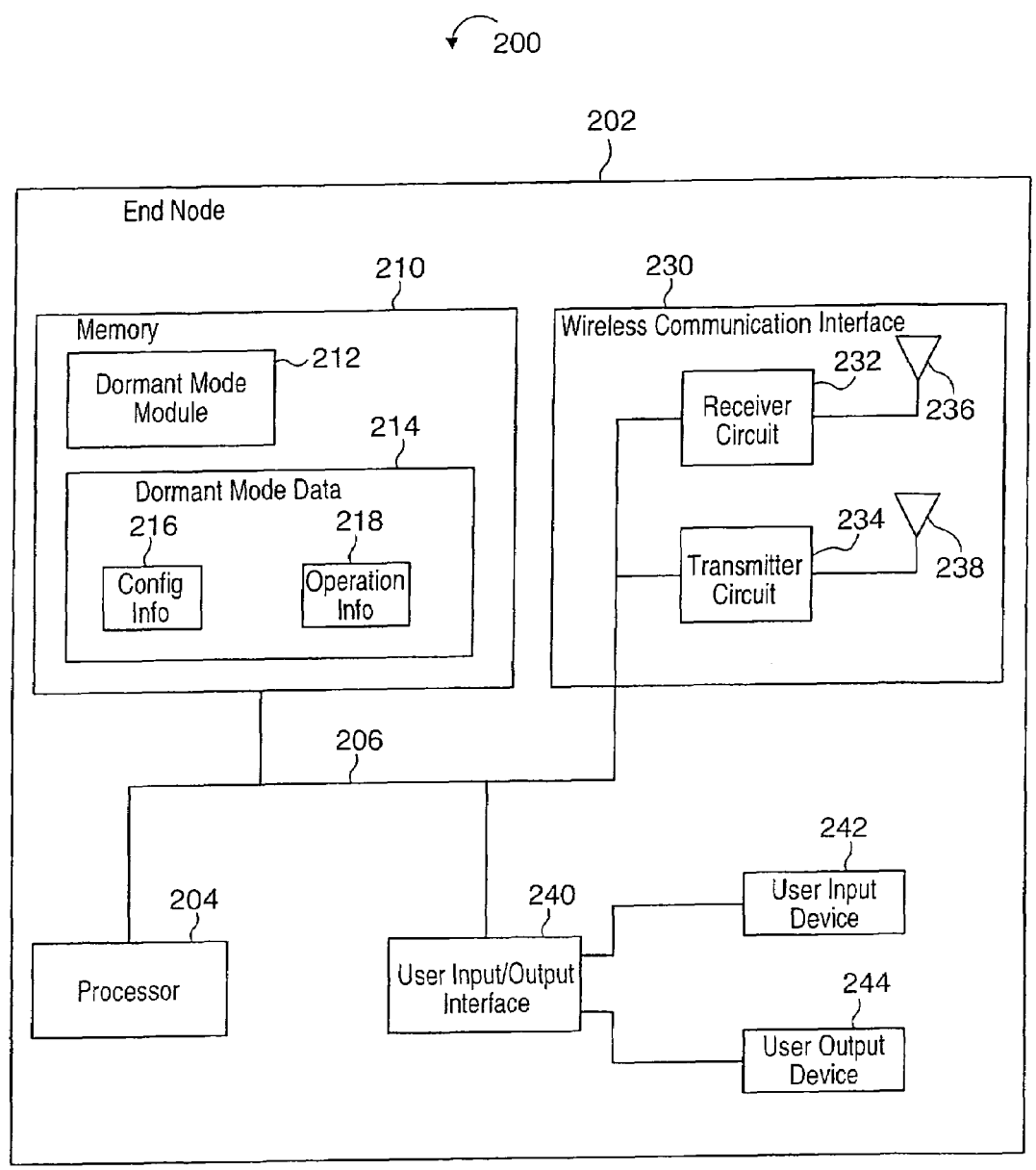
FIG. 2 illustrates an exemplary end node implemented in accordance with the present invention.

FIG. 2 provides a detailed illustration of an exemplary end node 200 implemented in accordance with the present invention. The exemplary end node 200, depicted in FIG. 2, is a detailed representation of an apparatus that may be used as any one of the end nodes 134, 136, 144, 146, 154, 156, depicted in FIG. 1. In the FIG. 2 embodiment, the end node 200 includes a processor 204, a wireless communication interface 230, a user input/output interface 240 and memory 210 coupled together by bus 206. Accordingly, via bus 206 the various components of the end node 200 can exchange information, signals and data. The components 204, 206, 210, 230, 240 of the end node 200 are located inside a housing 202.

The wireless communication interface 230 provides a mechanism by which the internal components of the end node 200 can send and receive signals to/from external devices and network nodes, e.g., access nodes. The wireless communication interface 230 includes, e.g., a receiver circuit 232 with a corresponding receiving antenna 236 and a transmitter circuit 234 with a corresponding transmitting antenna 238 used for coupling the end node 200 to other network nodes, e.g., via wireless communications channels.

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish certain tasks. In particular, the user input device 242 and user output device 244 provide the functionality that allows a user to control the end node 200 and applications, e.g., modules, programs, routines and/or functions, that execute in the memory 210 of the end node 200.

The processor 204 under control of various modules, e.g., routines, included in memory 210 controls operation of the end node 200 to perform various signaling and processing as discussed below. The modules included in memory 210 are executed on startup or as called by other modules. Modules may exchange data, information, and signals when executed. Modules may also share data and information when executed. In the FIG. 2 embodiment, the memory 210 of end node 200 of the present invention includes a dormant mode module 212 and dormant mode data 214.

The dormant mode module 212 controls the operation of the end node 200 associated with a dormant, yet page-able, mode of operation. Thus, module 212 controls processing relating to receiving and sending signals, e.g., messages, for location tracking and paging. Dormant mode data 214 includes, e.g., parameters, status information, and/or other information relating to operation in a dormant mode. In particular, the dormant mode data 214 may include configuration information 216, e.g., information about timing for transition into dormant mode, channels on which to monitor for page signals, timing associated with monitoring for page signals, etc., and operational information 218, e.g., information about current processing state, status of pending responses, etc. The dormant mode module 212 may access and/or modify the dormant mode data 214, e.g., update the configuration information 216 and/or the operational information 218.

Figure 3:
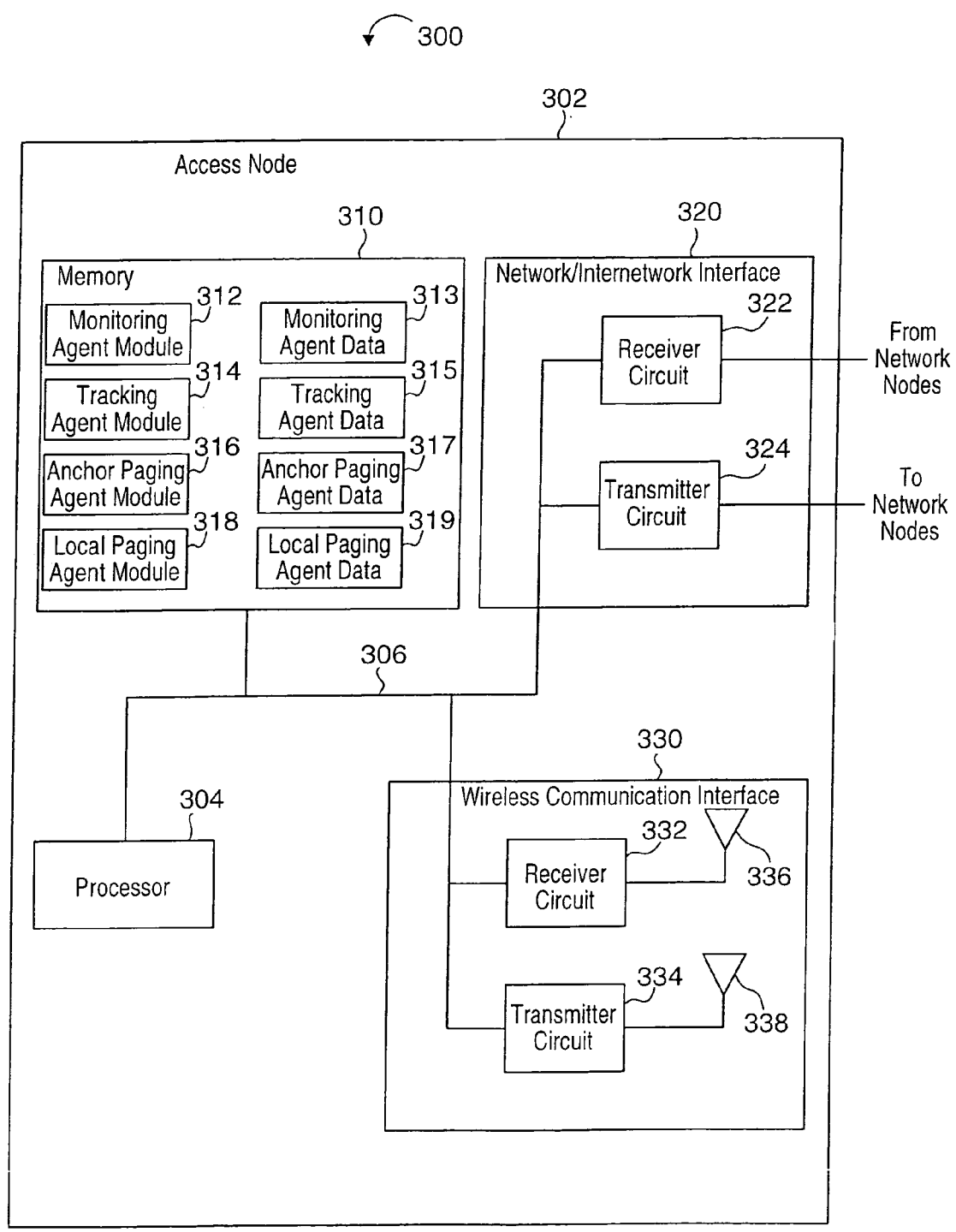
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 130, 140, 150, depicted in FIG. 1. In the FIG. 3 embodiment, the access node 300 includes a processor 304, a network/internetwork interface 320, a wireless communication interface 330 and memory 310, coupled together by bus 306. Accordingly, via bus 306 the various components of the access node 300 can exchange information, signals and data. The components 304, 306, 310, 320, 330 of the access node 300 are located inside a housing 302.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via copper wires or fiber optic lines. The wireless communication interface 330 also provides a mechanism by which the internal components of the access node 300 can send and receive signals to/from external devices and network nodes, e.g., end nodes. The wireless communication interface 330 includes, e.g., a receiver circuit 332 with a corresponding receiving antenna 336 and a transmitter circuit 334 with a corresponding transmitting antenna 338 used for coupling the access node 300 to other network nodes, e.g., via wireless communication channels.

The processor 304 under control of various modules, e.g., routines, included in memory 310 controls operation of the access node 300 to perform various signaling and processing, as discussed below. The modules included in memory 310 are executed on startup or as called by other modules. Modules may exchange data, information, and signals when executed. Modules may also share data and information when executed. In the FIG. 3 embodiment, the memory 310 of the access node 300 of the present invention includes an MA module 312, a TA module 314, an APA module 316, and an LPA module 318. Corresponding to each of these agent modules, memory 310 also includes MA data 313, TA data 315, APA data 317, and LPA data 319.

The MA module 312 controls the operation of the access node 300 to support MA functionality for a dormant end node such as the exemplary end node 200. The MA module 312 intercepts, and optionally stores, incoming signals, e.g., messages, destined for associated dormant end nodes and determines if a paging procedure should be initiated for the corresponding end node. The MA module 312 controls the processing of received signals from entities, e.g., other network nodes or other modules such as APA module 316, as necessary to create or update dormant end node dependent data, the interception and processing of received signals from other network nodes destined for associated dormant end nodes, the classification and filtering of said intercepted incoming signals to determine whether a page procedure for the corresponding end node should be initiated, and the sending of subsequent signals, as required to trigger the APA module 316 to commence a page procedure. The MA data 313 includes, e.g., end node identifiers, parameters, filtering information, and/or other information relating to providing MA functionality as described herein. The MA module 312 may access and/or modify the MA data 313.

The Tracking Agent module 314 controls the operation of the access node 300 to support TA functionality for a dormant end node such as the exemplary end node 200. The TA module 314 maintains location information, e.g., location/paging area, access node, cell and/or sector, for associated dormant end nodes and provides said information to other entities. While an end node is dormant, it may send location update request signals to its corresponding TA module. The frequency of location update request signals and accuracy of location information maintained by the TA is implementation dependent. The TA module 314 controls the processing of received signals from other entities, e.g., other network nodes or other modules such as APA module 316, as necessary to create or update dormant end node dependent data, the processing of received location update request signals and updating of the corresponding end node location information, the processing of received signals from other entities, e.g., other network nodes or other modules such as APA modules 316, requesting location information, e.g., current location/paging area, access node, cell and/or sector, associated with a particular dormant end node, and the sending of subsequent signals in response to requests from other entities, as required to provide acknowledgment or the requested information. The TA data 315 includes, e.g., end node location information and other information relating to providing TA functionality. The TA module 314 may access and/or modify the TA data 315.

The APA module 316 controls the operation of the access node 300 to support APA functionality for a dormant end node such as the exemplary end node 200. The APA module 316 provides the logic and signaling associated with sending a page to a dormant end node. The APA module controls the processing of received trigger signals from other entities, e.g., other network nodes or other modules such as the MA module 312, indicating that a page procedure should be initiated for a particular dormant end node, the exchange of signaling with the TA module 314 as needed to determine location of the dormant end node, the sending of subsequent page request signals to other entities, e.g., other network nodes or other modules such as the LPA module 318, and the processing of any corresponding response signals. The APA data 317 includes, information regarding the page procedure itself for each dormant end node or class of end nodes, e.g. frequency of page signals sent to other nodes, frequency of page signals to be sent over the wireless interface by access nodes attempting to page an end node, time-out values for the period to wait for end node response, operations to undertake in case time-outs are reached, etc. The APA module 316 may access and/or modify the APA data 317.

The LPA module 318 controls the operation of the access node 300 to support LPA functionality for a dormant end node such as the exemplary end node 200. The LPA module 318 supports coordination of page signaling and location tracking signaling within its local scope, e.g., a set of associated access node(s)/cell(s)/sector(s). The LPA module 318 controls the processing of received page request signals for a particular end node, e.g., from an APA module 316 located in the same access node or some other access node in the network, the sending or relaying of page request signals for a particular end node over the wireless communication interface 330, the receiving of page response signals from the end node in case it responds to the page, and sending or relaying of page response signals to the entity, e.g., an APA module, that initiated the page procedure. The LPA module 318 also controls the processing of received location update signals from dormant end nodes over the wireless communication interface 330, the sending or relaying of location update signals to the entity, e.g., a TA module, providing TA functionality for the particular dormant end node, the receiving of location update response signals from the entity providing TA functionality, and the sending or relaying of location update response signals to the dormant end node that initiated the location update procedure. The LPA data 319 includes, e.g., end-node related data regarding the operation of a page procedure over the wireless interface, such as frequency of page signals, channels to be used, time-out periods, etc. The LPA module 318 may access and/or modify the LPA data 319.

Figure 4:
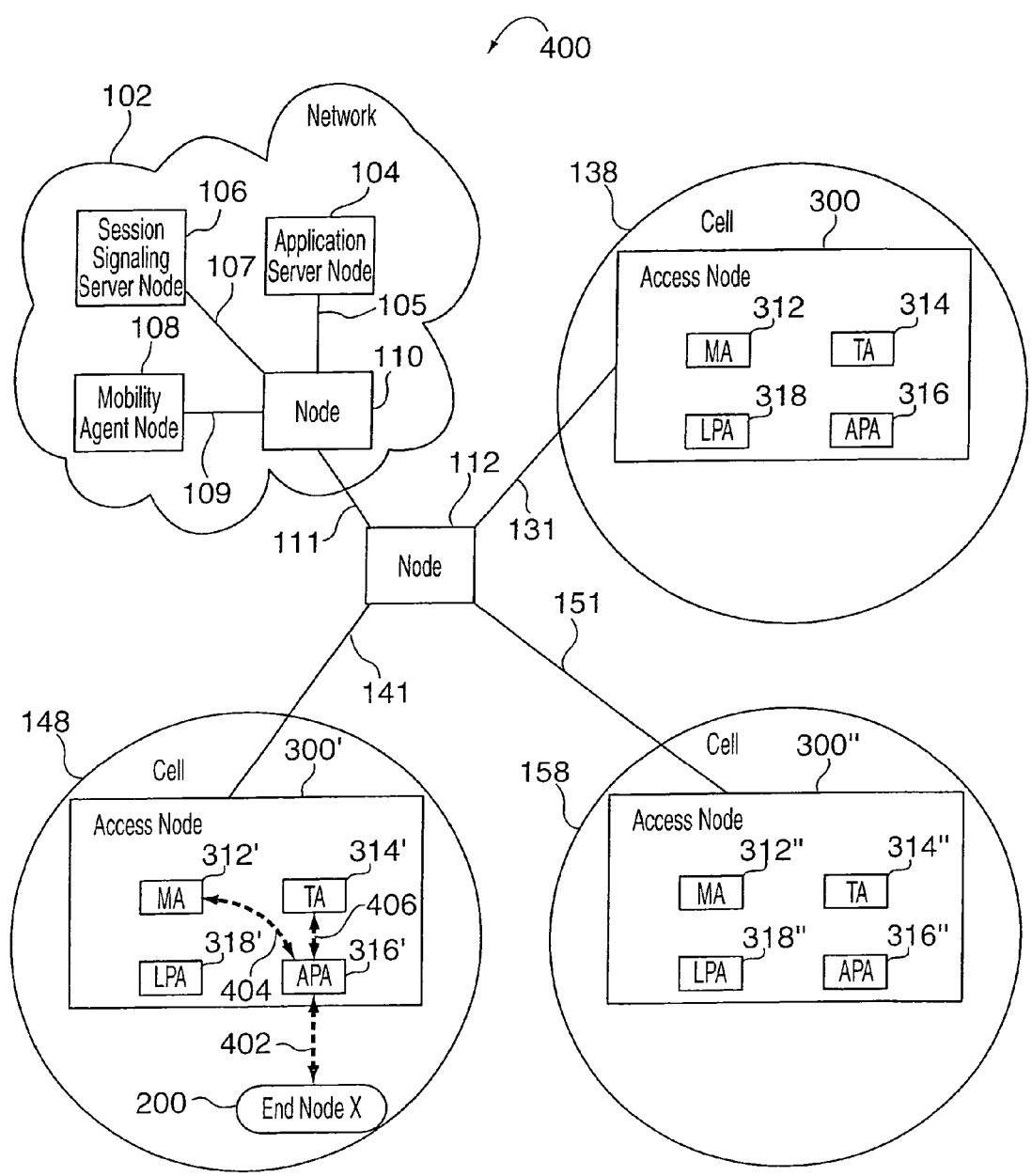
FIG. 4 illustrates signaling performed in accordance with the present invention when an end node transitions into a dormant, yet page-able, mode of operation.
Figure 5:
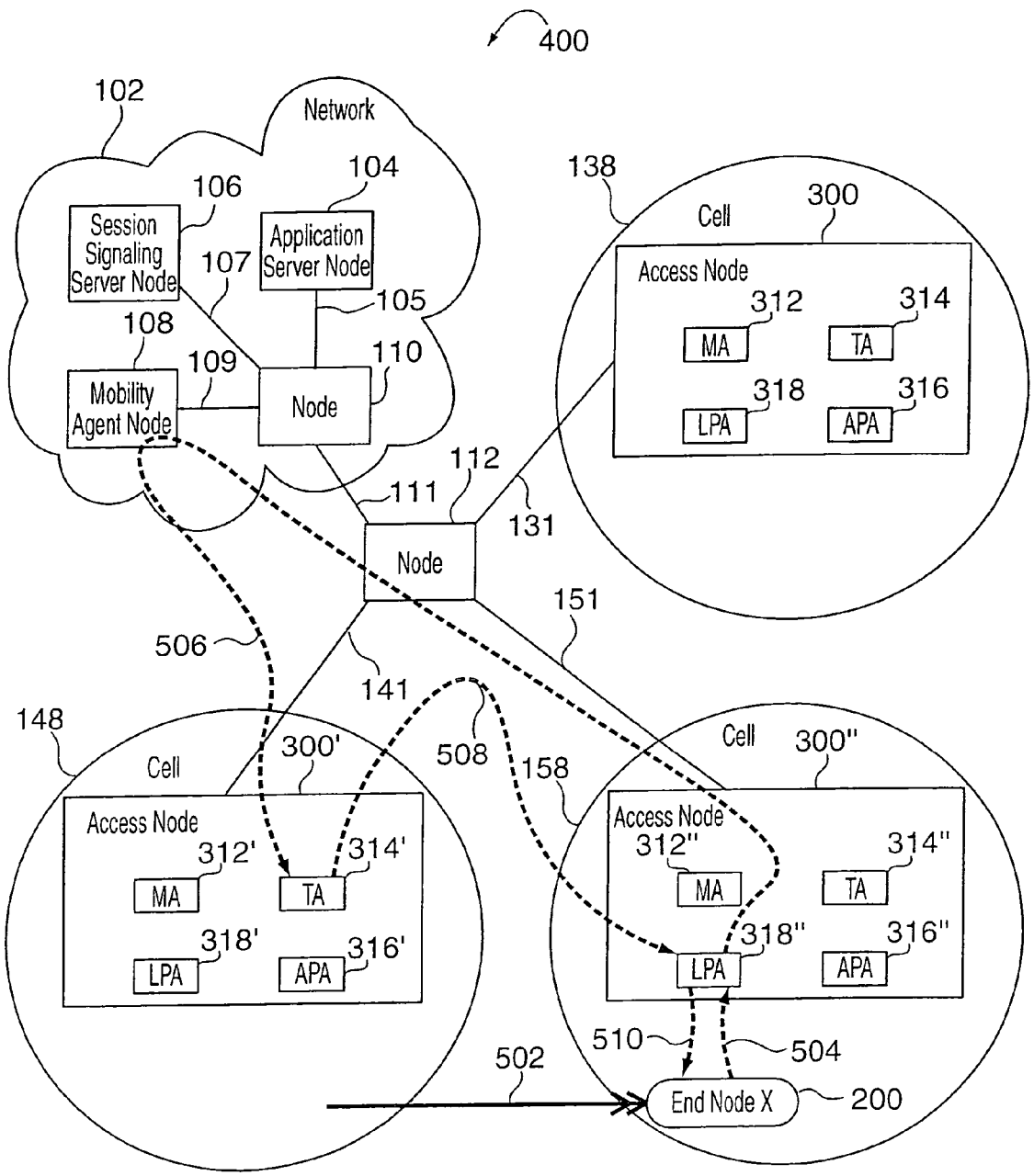
FIG. 5 illustrates signaling performed in accordance with the present invention when an end node updates its location information.
Figure 6:
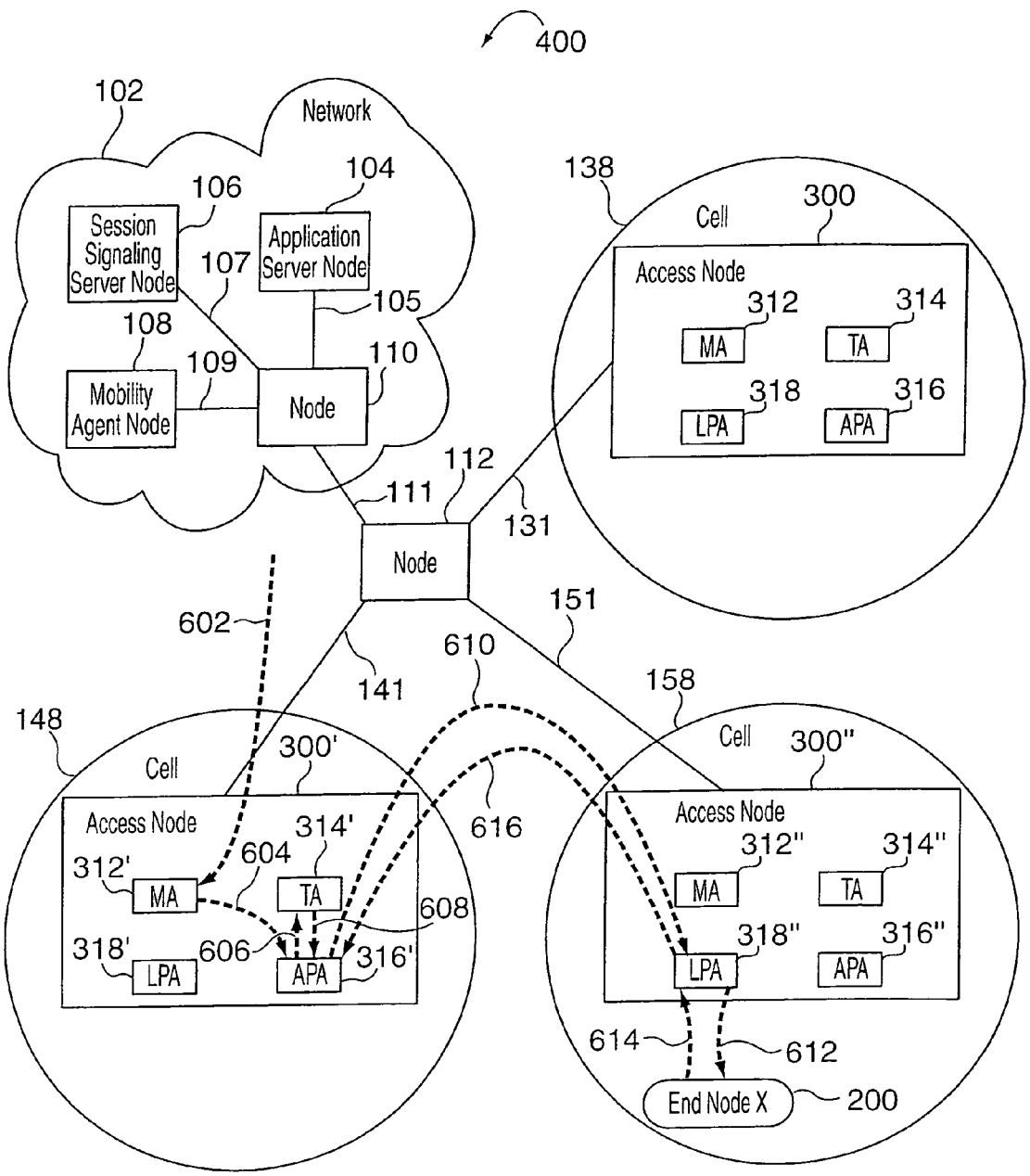
FIG. 6 illustrates signaling performed in accordance with the present invention when an end node is paged.

FIGS. 4, 5 and 6 illustrate the signaling performed in accordance with an exemplary embodiment of the invention. The signaling is illustrated in the context of a somewhat simplified version of an exemplary system 400, which is similar to the system 100 illustrated in FIG. 1. In the exemplary system 400 the access nodes 130, 140, 150 from system 100 have been replaced with access nodes, 300, 300', 300", implemented in accordance with the present invention. Each of the access nodes 300, 300', 300" shown in FIGS. 4, 5 and 6 are simplified representations of the exemplary access node 300 depicted in FIG. 3. Additionally, in the exemplary system 400 the end nodes 134, 136, 144, 146, 154, 156 (and corresponding access links 135, 137, 145, 147, 155, 157) from system 100 have been replaced with a single end node, X, 200 implemented in accordance with the present invention. End node, X, 200 shown in FIGS. 4, 5 and 6 is a simplified representation of end node 200 depicted in FIG. 2.

Transition into Dormant Mode of Operation

FIG. 4 provides a detailed illustration of exemplary signaling performed in accordance with the present invention when an end node transitions from an active to a dormant mode of operation. Note that, while the end node 200 is depicted as located in cell 148 and is assumed to be able to exchange signaling with the corresponding access node 300', an access link between the end node 200 and the access node 300' has not been explicitly depicted. The process of the end node 200 transitioning into the dormant mode may result from a variety of events or triggers, e.g., (1) a signal sent from the access node 300' and received by the dormant mode module 212 via the wireless communication interface 230, (2) a signal generated by a user input device 242 in response to a user action and received by the dormant mode module 212 via input/output interface 240, or (3) expiration of an inactivity timer maintained by the dormant mode module 212. The dormant mode data 214 includes configuration information 216 and operational information 218 that the dormant mode module 212 uses to determine the specific events or triggers that initiate the dormant mode transition process.

Upon determination that the end node 200 should transition into a dormant mode of operation, and provided that the end node must remain reachable (page-able) the end node 200 coordinates that transition by exchanging signaling with one or more network nodes, e.g., the local access node 300', that will provide MA/TA/APA functionality while the end node 200 is in the dormant mode. In the exemplary system 400, the local access node 300', corresponding to the current cell 148 in which the end node 200 is located, includes an MA module 312', a TA module 314', and an APA module 316'. In accordance with the exemplary embodiment of the present invention, the dormant mode module 212 in the end node 200 exchanges signaling 402 with the APA module 316' in the local access node 300' and the APA module 316' exchanges signaling 404', 406' with the MA module 312' and TA module 314' respectively, which are collocated in the local access node 300'. Some aspects of the signaling are that upon completion (1) the MA, TA, and APA modules have been informed that the end node 200 has transitioned into the dormant mode, and (2) the TA module has been informed of the current location of the end node 200, e.g., the current location/paging area, access node 300', cell 148, sector and/or LPA module 318' through which the mobile should be paged when needed. Alternative embodiments of the invention may use different signaling strategies provided that effectively equivalent or similar results are achieved.

Once the MA module 312' has been informed that the end node 200 has transitioned into the dormant mode it can begin interception and inspection of incoming signals, e.g., messages, destined for the end node 200 to determine if the end node 200 should be paged. Note that in accordance with the exemplary embodiment of the invention, the MA module 312' is located along the path of signals destined for the end node 200. Thus, although the end node 200 has transitioned into a dormant mode of operation, the mobility agent node 108 and/or other network nodes still contain routing information directing signals destined for the end node 200 to the last known point of attachment, e.g., the access node 300'. The dormant end node 200 may be required to periodically return to an active mode to refresh its routing information, as well as state information maintained by the MA, TA, and APA modules 312', 314', and 316', respectively.

Once the TA module 314' has been informed that the end node 200 has transitioned into the dormant mode, it maintains state information regarding the location of the dormant end node 200, e.g., a location/paging area comprising one or more access node(s), cell(s), sector(s) and/or LPA(s), through which the end node 200 should be paged when needed. State information maintained by the TA module 314' initially indicates the location from which the end node 200 transitioned into the dormant mode, e.g., the local location/paging area, access node 300', cell 148, sector and/or corresponding LPA. This state information may be updated to more accurately reflect the current location as the end node 200 migrates, e.g., to other location/paging areas, cells or sectors. In some embodiments of the invention, in addition to an indication of the current location of the end node 200, the TA module 314' also maintains information regarding prior locations associated with the end node 200, e.g., a historical list of the last ten location/paging areas, access nodes, cells and/or sectors associated with the end node 200. Note that in accordance with the exemplary embodiment of the invention, the TA module 314' is also located along the path of signals destined for the end node 200. This enables a reduction in the communication overhead and power consumption associated with sending location update signaling from the end node 200, as detailed subsequently herein.

Location Update Procedure

FIG. 5 provides a detailed illustration of exemplary signaling performed in accordance with the present invention when a dormant end node updates its location information with its corresponding TA module 314'. The process of the end node 200 updating its location information with its corresponding TA module 314' may result from a variety of events or triggers, e.g., (1) a signal sent from the access node 300" and received by the dormant mode module 212 via the wireless communication interface 230 indicating that the end node has migrated into a new location/paging area, cell, or sector, or (2) expiration of a location update timer maintained by the dormant mode module 212. The dormant mode data 214 includes configuration information 216 and operational information 218 that the dormant mode module 212 uses to determine the specific events or triggers that initiate the location update process. In the FIG. 5 illustration, a double arrow 502 is used to depict movement of the dormant end node 200 from one cell 148 to another cell 158, where said movement between cells triggers a location update process. Upon entering the cell 158, the dormant end node 200 sends a location update request signal 504 to the LPA module 318" in the local access node 300". In the exemplary embodiment of the invention, the location update request signal 504 includes information sufficient to identify the end node 200 and direct a location update request signal 506 to the corresponding TA module 314'. In some embodiments of the present invention, the location update request signal 504 sent by the dormant end node 200 also includes information indicating its current location, e.g., location/paging area, access node, cell and/or sector.

In some embodiments of the present invention, to minimize the communication overhead and power consumption associated with sending the location update request, a single parameter in the location update request signal 504 sent by dormant end node 200, e.g., an IP address, is used to both identify the end node 200 and direct a subsequent location update request signal 506, e.g., an IP datagram, from the LPA module 318" to the corresponding TA module 314'. This is facilitated by placement of the corresponding TA module 314' along the path of signals destined for the end node 200. Thus, in the case of IPv4 internetworking, for example, the location update request signal 504 sent by the dormant end node 200 could, and in some embodiments does, simply include the IPv4 address of the end node 200. Upon receiving and processing the location update request signal 504 from the dormant end node 200, the LPA module 318" sends a location update request signal 506, e.g., an IP datagram, destined to the end node 200 but which will be intercepted by the corresponding TA module 314'. In some embodiments of the invention, the LPA module 318" includes additional information in the location update request signal that it sends to the corresponding TA module 314', where said additional information indicates the current location, e.g., local location/paging area, access node, cell, sector and/or corresponding LPA, of the dormant end node 200.

The location update request signal 506 sent by the LPA module 318" travels through the exemplary communication system 400, potentially traversing through intermediate nodes, e.g., the mobility agent node 108, as directed by routing information for signals destined to end node 200, which in the exemplary embodiment leads to the access node 300' through which the end node 200 previously transitioned into the dormant mode. Upon reaching that access node 300', the TA module 314' intercepts the location update request signal 506. In one embodiment the location update request signal 506 sent by the LPA module 318" is an IP datagram addressed to end node 200 that can be easily identified for interception by the corresponding TA module 314' based on fields in the packet header, e.g., the IP datagram may have a known protocol identifier, port number and/or other header fields. Upon intercepting the location update request signal 506, the TA module 314' processes the signal 506 to determine if the location information associated with the end node 200 should be updated. In some embodiments of the invention the TA module first validates the authenticity of location update request 506 prior to updating the location information associated with end node 200. This validation may be performed either directly by the TA module 314' or via signaling with another entity, e.g., another module in the same node or another server node. If all the necessary checks pass, the TA module 314' updates the location information, e.g., location/paging area, access node 300", cell 158, sector and/or corresponding LPA, associated with the end node 200 in the TA data 315' to reflect the location of the dormant end node 200 reported in the location update request signal 506.

In some embodiments of the present invention, upon completion of processing the location update request signal 506, the TA module 314' sends a location update response signal 508 indicating success or failure of the location update attempt. In the exemplary embodiment depicted in FIG. 5, the TA module sends a location update response signal 508 to the LPA module 318" from which the location update request signal was received. Upon receiving and processing the location update response signal 508, the LPA module 318" sends a location update response signal 510 to the end node 200. In some embodiments of the present invention, the location update response signal 510 is transmitted to the end node 200 according to a preselected transmission relationship with the location update request signal 504 previously sent by the end node 200. For example, the location update response signal 510 may be at a fixed time after transmission of the corresponding location update request signal 504. In such embodiments, the location update response signal may comprise as little as one bit of information, e.g., indicating success or failure. In alternative embodiments of the present invention, in addition to an indication regarding the success/failure of the corresponding location update request signals 504, 506 the location update response signals 508, 510 also includes other information that may be used by the end node 200 to decide timing, frequency and content of subsequent location update request signals. In some embodiments of the present invention, affirmative location update response signals are returned to the end node 200 when a location update attempt succeeds, such that if an affirmative response is not received, the end node 200 should take corrective action to ensure continued reachability, e.g., re-attempt a location update or return to an active state. In some embodiments of the present invention, the TA module also returns a negative location update response when a location update attempt fails, e.g., if the location update request signal cannot be validated, or if the TA module has no record of the particular end node.

This location update procedure approach described above is similarly applicable for IPv6 internetworking. Also, in some embodiments the single parameter included in the location update request signal 504 sent by the end node 200 is a value or identifier other than an IP address, e.g., an EUI-64 or other hardware identifier, which may be used to determine an IP address of the end node 200. For example, there may be a on-to-one mapping between the value or identifier included in the location update request signal 504 sent by the end node 200 and the IP address of the end node 200 and/or the value or identifier included in the location update request signal 504 sent by the end node 200 may be used to compute the IP address of the end node 200.

In some alternative embodiments, the identity of the end node 200 and information sufficient to direct a location update request signal to the corresponding TA module 314' is provided by separate parameters in the location update request signal 504 sent by the dormant end node 200. In such embodiments, the location update request signal 506 from the LPA module 318" may be sent directly to the corresponding TA module 314' such that interception is not required. Also, in some alternative embodiments of the invention, information sufficient to direct a location update request signal to the corresponding TA module is preconfigured in the access node 300", e.g., in the LPA module 318", and/or LPA data 319". This approach may be particularly useful in the case for alternative embodiments in which the TA functionality is centrally located in the core of the network infrastructure. In each of the cases above, the location update request signals 504, 506 may, and in some embodiments do, include other information relating to the location tracking and paging, e.g., security information that may be used by the TA module 314' to validate the authenticity of the end node 200 and/or LPA module 318" sending the location update request signals.

Paging Procedure

FIG. 6 provides a detailed illustration of exemplary signaling performed in accordance with the present invention when a dormant end node is paged. The process of paging a dormant end node 200 may result from a variety of events or triggers, e.g., (1) the arrival of data signals at access node 300', where said data signals are destined for the dormant end node 200 and are intercepted by the MA module 312', or (2) the arrival of an explicit page request signal at the APA module 316', where said page request signal may have been generated by another node or server in the communication system. The MA data 313' and APA data 317' may, and in some embodiments do, include configuration information and/or operational information that the corresponding modules, 312' and 316' respectively, use to determine the specific events or triggers that initiate the paging process.

In the FIG. 6 illustration, the paging process is initiated in response to an incoming signal 602 destined for the end node 200. The signal 602 travels through the exemplary communication system 400, potentially traversing through intermediate nodes, e.g., the mobility agent node 108, as directed by routing information for signals destined to end node 200, which in the exemplary embodiment leads to the access node 300' through which the end node 200 previously transitioned into the dormant mode. Upon reaching that access node 300', the MA module 312' intercepts the signal 602 and processes it to determine if the end node 200 should be paged. In some embodiments, this determination by the MA module 312' is based in part on configuration and operational information included in the MA data 313'. In particular, the MA data 313' may, and in some embodiments does, include filtering information that enables the MA module 312' to limit the type of signals that trigger the paging process, e.g., IP datagrams may be filtered using traditional packet classification techniques based on header fields. Upon determination that the incoming signal 602 warrants paging the end node 200, the MA module 312' sends a page trigger signal 604 to the APA module 316', indicating that the end node 200 should be paged. In some embodiments the MA module 312' stores the incoming signal 602 that triggered the page, which can be subsequently delivered to the end node 200 when it returns to an active mode.

Upon receiving and processing the page trigger signal 604, the APA module 316' sends a location request signal 606 to the TA module 314'. The TA module 314' access its corresponding TA data 315' to determine the location information associated with the end node 200 and returns the information, e.g., location/paging area, access node, cell, sector and/or corresponding LPA, to the APA module 316' in a location response signal 608. Note that in some embodiments of the invention, the APA module 316' directly accesses the TA data 315', effectively eliminating the need for the signaling 606, 608 between the APA module 316' and the TA module 314'. The location information associated with the end node 200 may, and in some embodiments does, indicate a plurality of location/paging areas, access nodes, cells, sectors and/or LPAs, where the end node 200 may be located. When the location information comprises multiple such entities, a variety of paging strategies, e.g., blanket, expanding ring, or sequential, may be used to search for the end node 200.

Upon receiving the location information associated with the end node 200, e.g., via the location response signal 608, the APA module 316' determines the set of one or more access nodes or LPA modules to which page request signals should be sent. In the FIG. 6 example, the APA module 316' sends a page request signal 610 to the LPA module 318" located in access node 300". The page request signal 610 contains an indication of the end node 200 to be paged, as well as potentially other information associated with paging the end node 200, e.g., the cell or sector in which the end node 200 should be paged. In the context of IP internetworking, the page request signal 610 may be an IP datagram.

Upon receiving the page request signal 610, the LPA module 318" processes the signal and, in some embodiments, accesses its associated LPA data 319" to determine the specifics of how and where to page for the indicated end node 200. The page request signal 610 may, and in some embodiments does, include information regarding a specific cell, sector and/or interface through which a page request signal 612 for the end node 200 should be sent. Following determination of where to page for the end node 200, the LPA module 318" sends a page request signal 612 for the end node 200 via the wireless communication interface 330".

Upon receiving the page request signal 612, the dormant mode module 212 in the end node 200 determines the course of action. In some embodiments, the course of action is determined, in part, based on information contained in the received page request signal 612, e.g., an identifier, priority indication or action code, as well as information contained in the dormant mode data 213. In some embodiments of the present invention, the page request signaling 610, 612 includes at least a portion of the signal 602 that triggered the paging process. In the FIG. 6 example, after processing the received page request signal 612, the end node 200 returns to an active mode and sends a page response signal 614. Upon receiving and processing the page response signal 614, the LPA module 318" sends a page response signal 616 to the APA module 316' that initiated the page process. In some embodiments, reception of the page response signal 616 by the APA module 316' is used to terminate the page process and clean up state information for the previously dormant end node 200. The LPA module 318" may, and in some embodiments does, send such a signal 616 to the APA module 316' even if no page response is received from the end node 200, e.g. upon expiration of a wait timer. In some embodiments, the page response signal 616 sent by the LPA module 318" contains an indication as to the success or failure of the page its cell(s)/sector(s).

Upon receiving an affirmative page response signal 616, the APA module undertakes other operations as prescribed to follow a successful page procedure, e.g. signal to the MA module 312' that it should forward the stored incoming signal 602 to the end node 200 at its new location, e.g., the access node 300" associated with cell 158 in which the end node received the page request signal 612. In some embodiments of the present invention, the end node 200 undertakes additional procedures and/or sends additional signaling to update its routing for signals, e.g., data traffic, destined to it, e.g., the end node 200 may send a MIP registration request to the mobility agent 108. Similarly, the end node 200 may undertake additional procedures and/or send additional signaling to retrieve any incoming signals, e.g., data traffic, stored by the previous MA module 312' or which subsequently arrive at the previous access node 300'.

Granularity of Location Information

The methods and apparatus of the invention described herein are applicable with various granularities of location information, e.g., location/paging areas comprising one or more access nodes, cells, sectors and/or LPAs.

In some embodiments of the present invention, location information maintained by the TA and included in location update request signals is very fine grained, e.g., indicating an individual cell or sector in which the dormant end node is reported to be reachable (page-able). Availability of such fine grained location information enables single-cell/sector targeted paging, e.g., directing page signaling to a cell/sector, which minimizes the communication overhead and resources associated with paging dormant end nodes. This approach also has the benefit of eliminating latency associated with searching for a dormant end node using various paging strategies when the precise location of the dormant end node is unknown. Minimization of the latency associated with searching for the dormant end node, in turn, enables the end node to decrease the frequency of monitoring for page signaling required to achieve a target upper bound on overall paging latency, thereby conserving power and extending operational lifetime of the end node. When operating in single-cell/sector targeted paging scenarios, a dormant end node may, and in some embodiments does, send a location update request signal on each change of cell and/or sector. The end node may determine that it has changed cell and/or sector using a variety of known techniques, e.g., reception of cell/sector identification information broadcast from the corresponding base station or access node.

In some alternative embodiments of the present invention, location information maintained by the TA and included in location update request signals is more coarse grained, e.g., indicating a plurality of access nodes, cells, sectors or LPAs through which the dormant end node is reported to be reachable (page-able). In some embodiments, coarse grained location information is based on statically or dynamically defined location/paging areas, e.g., either overlapping or non-overlapping sets of geographically close access nodes, cells, sectors or LPAs are grouped together into identifiable location/paging areas. When operating in area-based paging scenarios, a dormant end node may, and in some embodiments does, send a location update request signal on each change of location/paging area. The end node may determine that it has changed location/paging area using a variety of known techniques, e.g., reception of location/paging area identification information broadcast from the corresponding base station or access node. In such embodiments, location update request signaling sent to the TA should include an indication of the identifiable location/paging area in which the end node is reported to be reachable (page-able). Upon initiation of page signaling for a particular dormant end node, a variety of well known paging strategies, e.g., blanket, expanding ring, or sequential, may be used to search for the dormant end node throughout the set of access nodes, cells, sectors and/or LPAs corresponding to the location/paging area in which the dormant end node is reported to be reachable (page-able).

Regardless of the granularity of location/paging area information, some embodiments of the present invention include a limited location tracking/paging scope, e.g., a limitation on set of access nodes, MAs, TAs, APAs and/or LPAs that can coordinate or exchange location tracking and page signaling. Such a limitation may result from technical constraints, e.g., scalability of addressing, routing or security architecture, or from policy constraints, e.g., administration of separately owned and operated networks. In such embodiments, a dormant end node may, and in some embodiments does, return to an active mode, when it migrates beyond the location tracking/paging scope of its MA, TA, and/or APA. The end node may determine that it has migrated beyond its previously supported location tracking/paging scope using a variety of known techniques, e.g., reception of operator identification or other service area information broadcast from the corresponding base station or access node. In some embodiments of the present invention, actions undertaken by the end node upon migration beyond its previously supported location tracking/paging scope include a variety of control operations, e.g., authentication, authorization, registration, address allocation and/or agent allocation. Following any required control operations, the end node may, and in some embodiments does, transition back into the dormant mode of operation.

Authenticating Location Updates

Figure 7:
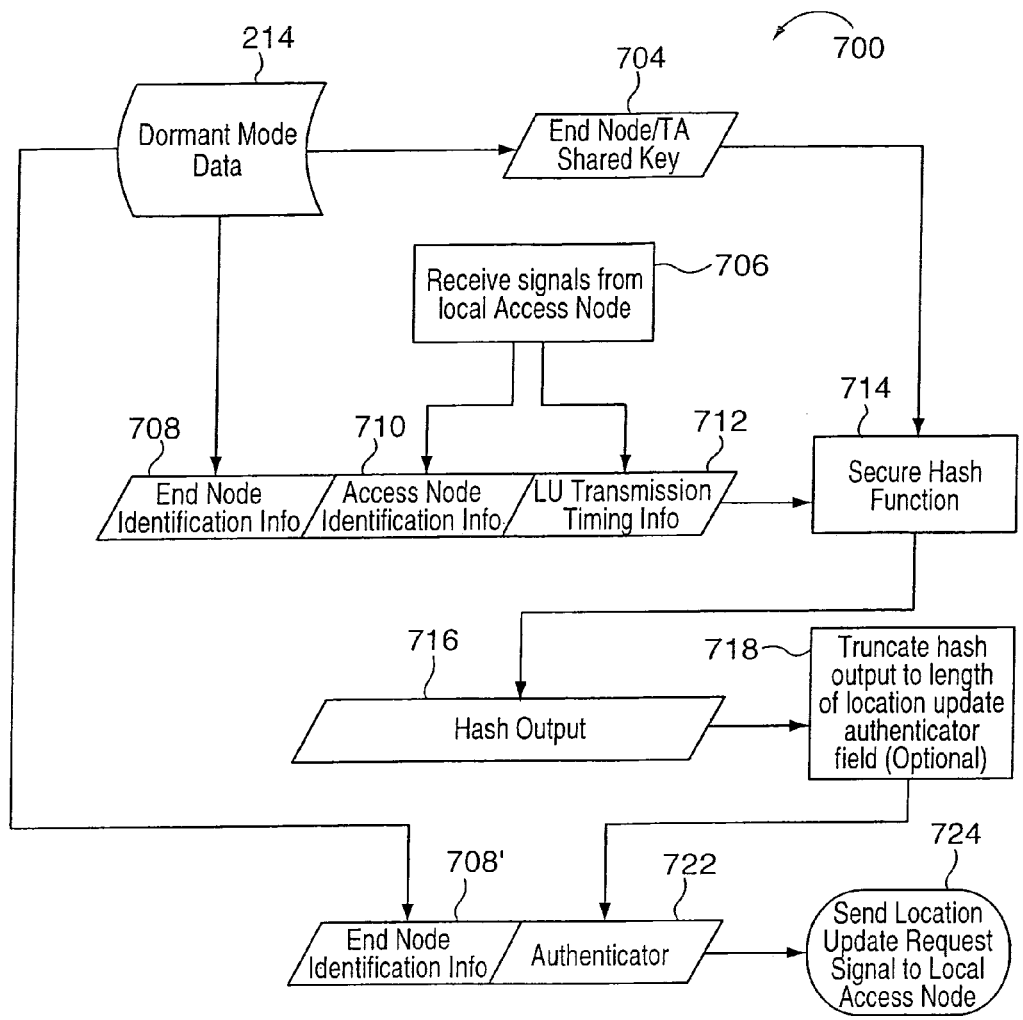
FIG. 7 illustrates an exemplary end node procedure for generating an authenticated location update in accordance with the present invention.
Figure 8:
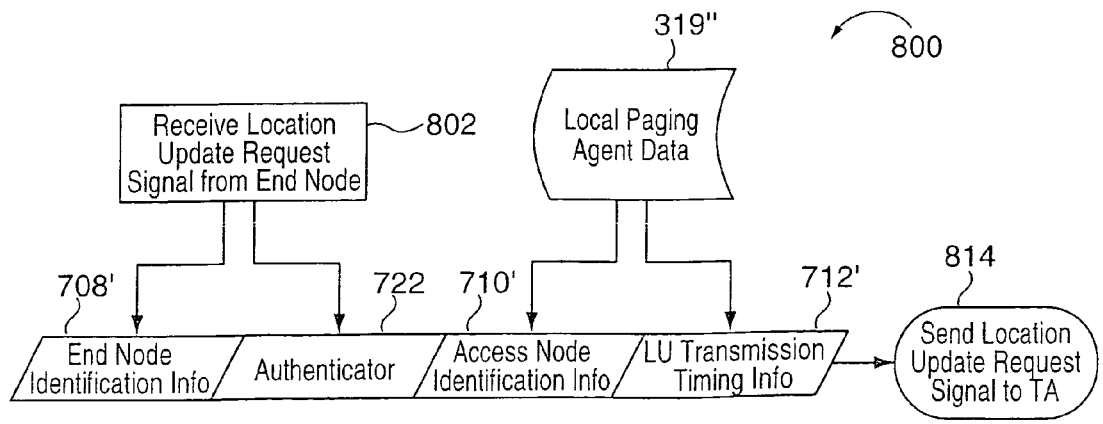
FIG. 8 illustrates an exemplary Local Paging Agent procedure for relaying an authenticated location update in accordance with the present invention.
Figure 9:
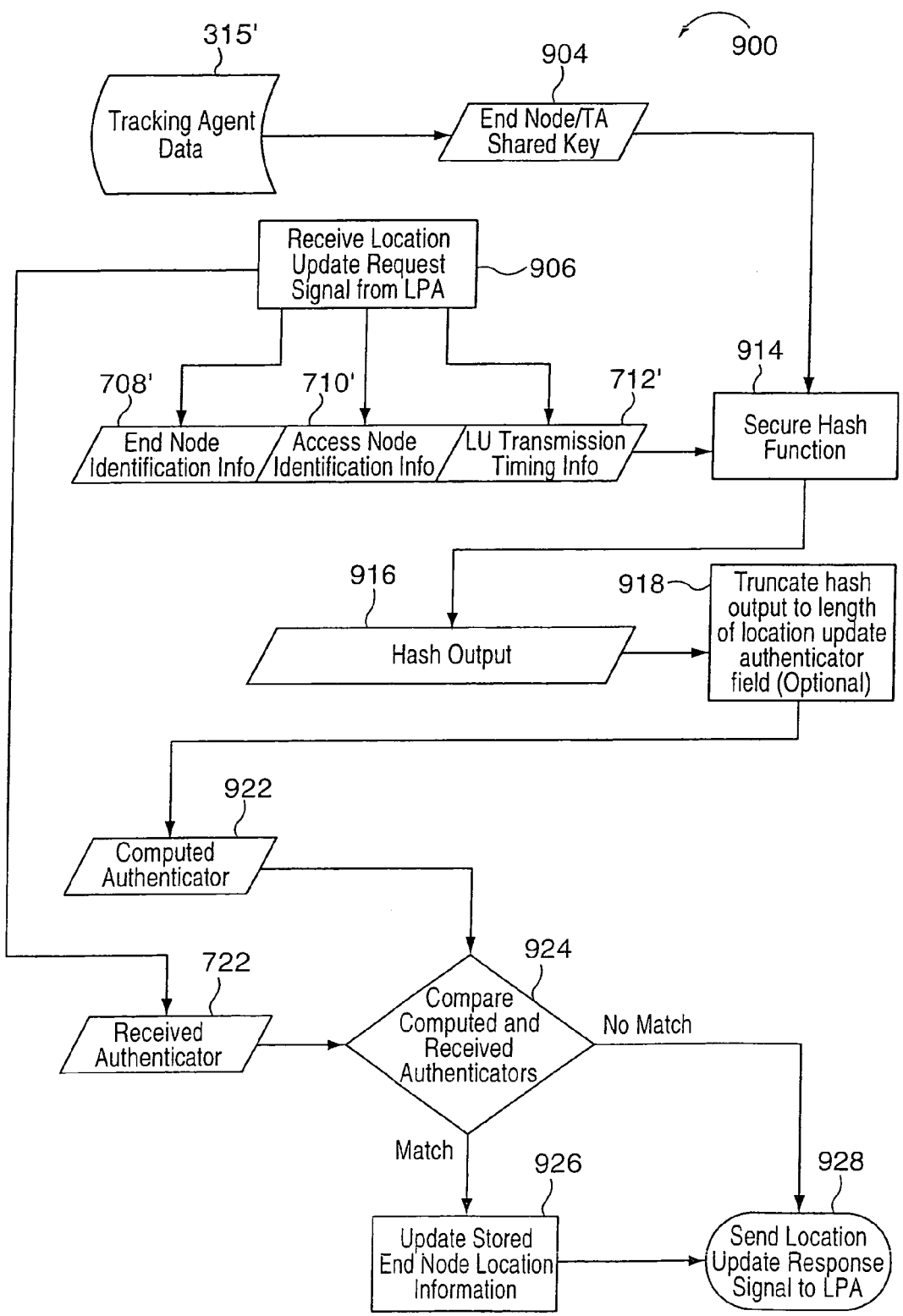
FIG. 9 illustrates an exemplary Tracking Agent procedure for validating an authenticated location update in accordance with the present invention.

FIGS. 7, 8, and 9 collectively illustrate exemplary processing performed in accordance with the present invention to enable authentication of location update request signals from an end node to its corresponding TA. Authentication of location update request signaling provides protection against spoofing attacks, e.g., where one or more malicious end nodes send illegitimate location update request signals intended to render legitimate dormant end nodes unreachable. The innovative approach illustrated in FIGS. 7-9 exploits attributes of the location update signal sent by an end node, e.g., transmission timing information, and/or the availability of other information known to both the end node and the access node through which it sends a location update signal to provide efficient protection from replay attacks. The processing illustrated FIGS. 7-9 is subsequently described in the context of the FIG. 5 location update example.

FIG. 7 provides a detailed illustration of exemplary processing performed in accordance with the present invention when a location update request signal is generated by an end node implemented in accordance with the present invention, such as the exemplary end node 200 depicted in FIG. 2. An end node 200 may execute the location update generation procedure 700 to update its location information with its corresponding TA in response to a variety of events or triggers, as previously described. In this exemplary embodiment of the invention, the location update generation procedure 700 detailed in FIG. 7 is performed by the dormant mode module 212 of end node 200 and make use of the dormant mode data 214. In the FIG. 7 example, the dormant mode data 214 includes a copy of the end node/TA shared key 704, which is a security key, e.g., a pseudo-random string of bytes, typically known only to the end node 200 and its TA. In some embodiments, the shared key is also known by another trusted entity, e.g., a security server. This key is used by the end node 200 to compute an authenticator for a location update request signal in a way that the TA can verify that the location update request signal was indeed sent by the end node 200 bearing the identification included in the received signal, as will be detailed next. The dormant mode data 214 also includes the end node identification information 708, 708', e.g., a hardware address, network address, or a dormant mode identifier associated with the end node 200.

Once the location update generation procedure 700 is called into operation, the first step 706 is undertaken, whereby the end node 200 receives signals from the local access node, e.g., the access node 300" through which the end node 200 intends to send a location update request signal to its TA, and extracts certain information. The required signals from the access node 300" are either periodically broadcast or asynchronously sent in response to a signal from the end node 200. The information extracted from the signals comprises the access node identification information 710, e.g., a hardware address, network address, or other identifier associated with the access node 300", and the location update transmission timing information 712, e.g., a timestamp or sequence number associated with the transmission time of the location update request signal to be sent by the end node 200. Incorporation of this information 710, 712 into the authenticator 722, of the location update request signal as illustrated provides protection from replay attacks. Note that the access node identification information 710 and location update transmission timing information constitute exemplary information that is known and/or available to both the end node 200 and the access node 300. This information will be used in the computation of an authenticator by the end node 200, but need not be transmitted to the access node 300 in the subsequent location update request signal, since the access node 300 can infer the same information from reception of the location update request signal. In some embodiments of the present invention, the known information includes other transmission channel information, e.g., frequency or spreading code.

The end node/TA shared key 704, along with a concatenation of the end node identification information 708, access node identification information 710 and location update transmission timing information 712, are input to a one-way secure hash function 714. Exemplary secure hash functions well known in the art are HMAC-MD5, HMAC-SHA-1. These functions are based on a one-way message digest function well-known in the art, such as MD5 and SHA-1, which take an arbitrary length string of bytes, e.g., a message, and produce a fixed-length, random-looking digest. They are termed "one-way" due to the difficulty of determining the original message from the digest. One-way secure hash functions use a secure key to produce a digest of a message, using on one or more calls to the underlying message digest function. In this example, the concatenation of the end node identification information 708, access node identification information 710 and location update transmission timing information 712 is the "message" and the end node/TA shared key 704 is the "secure key" that are input to the secure hash function 714. The hash output 716, a string of bytes, is the corresponding "digest". In some embodiments of the present invention, the hash output 716 is truncated in step 718, as needed to fit within the prescribed length of the authenticator 722 of a location update request signal. Thus, the authenticator 722 is, in this embodiment, the hash output 716, optionally truncated.

Both the end node identification information 708' and the authenticator 722 are included in the location update request signal, e.g., signal 504 depicted in FIG. 5, sent by the end node 200, in step 724. However, the information known to both the end node 200 and the access node 300 that was used in computation of the authenticator 722, e.g., the access node identification information 710 and the location update transmission timing information 712, need not be included in the location update request signal, since they can be determined by the access node 300 upon reception of the location update request signal. Note that, as illustrated in FIGS. 7-9, the end node identification information 708 input to the secure hash function 714 and the end node identification information 708' included in the location update request signal are equivalent. However, in some alternative embodiments they may differ, provided that the end node identification information 708' included in the location update request signal is sufficient to enable the TA to determine the end node identification information 708 input to the secure hash function 714.

FIG. 8 provides a detailed illustration of exemplary processing performed in accordance with the present invention when a location update request signal from an end node is received and processed by a local access node implemented in accordance with the present invention, such as the exemplary access node 300 depicted in FIG. 3. In this exemplary embodiment of the invention reception and processing of the location update request signals is performed by the LPA module 318" within the local access node 300" and makes use of the LPA data 319". Upon reception of a location update request signal, e.g., signal 504 depicted in FIG. 5, from an end node 200, the LPA module 318" in the local access node 300" executes the location update relay procedure 800, as detailed in FIG. 8.

The location update relay procedure 800 starts in step 802, where the LPA module 318" receives the location update request signal, e.g., signal 504 depicted in FIG. 5, from the end node 200. Out of this location update request signal, the LPA module 318" extracts the end node identification information 708', and the authenticator 722. Note that these are the same two values included in the location update request signal sent by the end node 200 in step 724 of FIG. 7. Based on an attribute of the received location update request signal, e.g., transmission timing and/or channel, the LPA module 319" determines the known information used by the end node 200 in the computation of the authenticator 722. In some embodiments, the LPA module 318" extracts the access node identification information 710', e.g., a hardware address, network address, or other identifier associated with the access node, as well as location update transmission timing information 712' from the LPA data 319". Note that for a proper location update request signal, these two values 710', 712' are equivalent to the values by the same name 710, 712 that were previously used by the end node 200 as input to the secure hash function in step 714 of FIG. 7. The end node identification information 708', authenticator 722, access node identification information 710', and location update transmission timing information 712' are included in the location update request signal, e.g., signal 506 depicted in FIG. 5, sent by the LPA module 318" in the local access node 300", in step 814. The location update request signal, e.g., signal 506 depicted in FIG. 5, sent by the LPA module 318 in step 814 is directed to the TA associated with the end node 200.

FIG. 9 provides a detailed illustration of exemplary processing performed in accordance with the present invention when a location update request signal from an end node is received and processed by the end node's TA, such as the TA module 314 of the exemplary access node 300 depicted in FIG. 3. In this exemplary embodiment of the present invention, TA functionality for the end node 200 is provided by the TA module 314' of the access node 300' through which the end node 200 previously transitioned into the dormant mode and makes use of the corresponding TA data 315'. Upon reception of a location update request signal, e.g., signal 506 depicted in FIG. 5, for the associated end node 200, the TA module 314' of the access node 300' executes the location update validation procedure 900, as detailed in FIG. 9.

The location update validation procedure 900 starts in step 906, where the TA module 314' receives a location update request signal, e.g., signal 506 depicted in FIG. 5, from the LPA module 318" of the local access node 300" through which the end node 200 is attempting to updates its location. Out of this location update request signal, e.g., signal 506 depicted in FIG. 5, the TA module 314' extracts the received authenticator 722, end node identification information 708', the access node identification information 710', and the location update transmission timing information 712'. Note that these are the same four values included in the location update request signal sent by the LPA module 318" in step 814 of FIG. 8.

In the FIG. 9 example, the TA data 315' includes a copy of the end node/TA shared key 904, which is a security key, e.g., a pseudo-random string of bytes, typically known only to the end node 200 and its TA. The end node/TA shared key 904, along with a concatenation of the end node identification information 708', access node identification information 710' and location update transmission timing information 712' extracted from the location update request signal are input to a one-way secure hash function 914. Note that for a proper location update request each of the following should be true:

1. the secure hash function 914 is the same as the secure hash function 714 used by the end node 200 in FIG. 7,
2. the end node/TA shared key 904 matches the end node/TA shared key 704 used by the end node 200 in FIG. 7, and
3. the concatenation of the end node identification information 708', access node identification information 710' and location update transmission timing information 712' input into the secure hash function 914 matches the concatenation of the end node identification information 708, access node identification information 710 and location update transmission timing information 712 input into the secure hash function 714 by the end node in FIG. 7.

The secure hash function 914 produces the hash output 916, which is optionally truncated in step 918, such as is necessary to fit within the prescribed length of the computed authenticator 922. The truncation process 918 should match that employed by the end node in step 718, as shown in FIG. 7.

The TA module 314' compares the received authenticator 722, e.g., from the location update request signal 506, to the (internally) computed authenticator 922 in step 924, for example using a byte-wise comparison. If as a result of this comparison 924 the two authenticators are shown to match, the location update request signal is considered valid and the TA module 314' proceeds to step 926, whereby the stored end node location information is updated. Following step 926, the TA module 314' proceeds to step 928, whereby the TA sends a location update response signal, e.g., signal 508 depicted in FIG. 5, back to the LPA from which the location update request signal was received, indicating success of the location update process. Additionally, if, as a result of the comparison 924, the authenticators are shown not to match, the TA module 314' may optionally proceed directly to step 928, whereby a location update response signal is sent back to the LPA, indicating failure of the location update process.

The exemplary embodiment of the present invention illustrated in FIGS. 7 through 9 and described above, focuses on the addition of authentication to location update request signaling between the end node and the TA using a pre-established shared key, e.g., the end node/TA shared key. A key aspect of the invention is the incorporation of location update transmission timing information in the computation of the authenticator. Persons skilled in the art can readily apply this innovation to other known techniques for message authentication, including those based on use of public/private key pairs, e.g., digital signatures.

Detection and Mitigation of Location Update Spoofing Attacks

In some embodiments of the present invention, e.g., when bandwidth conservation is a priority, the location update request signal sent by a dormant end node, e.g., signal 504 depicted in FIG. 5, include only a relatively short length authenticator, e.g., one or two bytes. For example, in the context of the FIGS. 7-9, the hash outputs 716, 916 can be truncated in steps 718 and 918, respectively, to one or two bytes in length for use as the authenticators 722, 922. This has the advantage of reducing the overall size of the location update request signals, e.g., signals 504 and 506 depicted in FIG. 5, but also increases the likelihood that a spoofed location update request signal with a random authenticator will be perceived as legitimate. Thus, as the size of the authenticator is reduced, the strength of the authentication is also reduced. In some embodiments of the present invention, e.g., those supporting only weak authentication of location update request signaling, the following processing is employed to detect location update spoofing attacks and mitigate their effect on the location tracking and paging system.

Provided that location update request signals, e.g., signals 504 and 506 depicted in FIG. 5, include authentication information, e.g., even a weak authenticator as described above, the TA and/or LPA can detect certain types of location update spoofing attacks by computing, e.g., measuring or estimating, the fraction (or rate) of location update requests that fail authentication.

In some embodiments, the TA directly computes, e.g., measures or estimates, the fraction (or rate) of location update request signals that fail authentication for one or more dormant end nodes and compares the computed value(s) to a pre-determined threshold, where exceeding the threshold is indicative of a spoofing attack. In some such embodiments, the TA performs this operation separately for each particular dormant end node associated with the TA. Also, in some embodiment, the TA re-computes an estimate upon receiving and processing each location update request signal for a particular end node and compares the new estimate to the threshold. A variety of well known algorithms, e.g., exponentially weighted moving average, may be used to compute an estimate that is not heavily influenced by a small number of samples but will still provide timely indication of significant changes in the fraction (or rate) of authentication failures. If the computed value exceeds the pre-determined threshold, the TA undertakes any prescribed operations, e.g., creates a log entry or sends an alarm signal detailing information about the spoofing attack and/or temporarily disables processing of subsequent location update request signals for the corresponding dormant end node.

In some embodiments, as part of processing a received location update request signal, the TA returns a location update response signal to the LPA, e.g., signal 508 depicted in FIG. 5, which includes an indication of authentication pass/fail. The LPA may, and in some embodiments does, determine that a particular location update request signal has failed authentication based on the indication received from the TA in the corresponding location update response signal. In some such embodiments, the LPA computes, e.g., measures or estimates, the fraction (or rate) of location update request signals that fail authentication for one or more dormant end nodes and compares the computed value(s) to a pre-determined threshold, where exceeding the threshold is indicative of a spoofing attack. The LPA may, and in some embodiments does, perform this operation in aggregate for a plurality of dormant end node, e.g., all dormant end nodes, that send location update request signals via the LPA. Also, in some embodiment, the LPA re-computes an estimate upon receiving and processing each location update response signal and compares the new estimate to the threshold. A variety of well known algorithms, e.g., exponentially weighted moving average, may be used to compute an estimate that is not heavily influenced by a small number of samples but will still provide timely indication of significant changes in the fraction (or rate) of authentication failures. If the computed value exceeds the pre-determined threshold, the LPA undertakes any prescribed operations, e.g., creates a log entry or sends an alarm signal detailing information about the spoofing attack and/or temporarily disables processing of subsequent location update request signals.

Note that both the TA and LPA location update spoofing detection/mitigation techniques described above may be used individually or together. The TA detection/mitigation technique is likely better suited for detection/mitigation of spoofing attacks targeted at a particular dormant end node, while the LPA detection/mitigation technique is likely better suited for detection/mitigation of attacks emanating from a particular malicious end node.

Improving Robustness of Paging with Location History Information

In some embodiments of the present invention, e.g., when bandwidth conservation is a priority, the location update request signal sent by a dormant end node, e.g., signal 504 depicted in FIG. 5, includes no (or only weak) authentication information. However, a location tracking and paging system with unauthenticated (or only weakly authenticated) location update request signaling may be vulnerable to spoofing attacks that can impact reachability of legitimate dormant end nodes. Certain types of errors in the location update request signals may also impact the reachability of dormant end node. In some embodiments, the following processing is employed to improve the robustness of the location tracking and paging system and add resistance to location update spoofing attacks.

In addition to maintaining an indication of the current location of a dormant end node, e.g., the last reported location/paging area, access node, cell, sector and/or LPA, the TA also maintains a location history pertaining to the dormant end node. In one embodiment of the present invention, the location history is maintained in the form of a list of reported locations, e.g., a list of reported location/paging areas, access nodes, cells, sectors and/or LPAs, which, in some embodiments, includes an indication of the order in which the reported location information was received. When the APA initiates the paging process for a particular dormant end node, the APA acquires the location history information from the TA and uses this information to direct page request signaling to one or more LPAs, e.g., as depicted in FIG. 6. A variety of different strategies, e.g., search algorithms, may be used to direct page request signaling to LPAs based on the location history. In some embodiment of the present invention, the APA initially directs page signaling the LPA(s) associated with the most recently reported location information maintained by the TA. Then, if an affirmative page response signal is not received from the LPA(s) associated with the most recently reported location information, e.g., upon expiration of a wait timer, the APA directs page request signaling to LPA(s) associated with previously reported location information.

In some embodiments, the TA keeps an ordered list of the N most recently reported locations, where N is an integer, e.g., a prescribed system configuration parameter known to the TA and/or dormant end node. The list of previously reported locations for a dormant end node starts out with a single entry indicating the location of the end node at the time that it transitioned into a dormant mode. As the TA receives valid location update requests, it adds, deletes and/or re-orders list entries as follows. Note that the following description assumes that the "head" of the list indicates the most recent location information and the "tail" of the list indicates the least recent location information. Alternative implementations should be readily apparent. If the TA receives a valid location update request indicating a location that is already in the list, the list is re-ordered such that reported location is placed at the head of the list (indicating that it is the most recent), but the number of entries in the list remains unchanged. If the TA receives a valid location update request indicating a location that is not already in the list, the reported location is added to the head of the list (indicating that it is the most recent). If addition of the newly reported location increases the size of the list beyond N, to N+1, the location entry at the tail of the list (the least recent) is deleted, maintaining the list size to no more than N entries.

In some alternative embodiments, the TA keeps an ordered list of the N most recently reported locations, where N is an integer, e.g., a prescribed system configuration parameter known to the TA and/or dormant end node, but once the list reaches N entries subsequent location update requests are not accepted until after the dormant end node provides stronger authentication information. For example, if the TA receives a location update request signal and the list already contains N entries, the TA either returns no location update response (implicitly indicating failure of the location update) or returns a negative location update response, e.g., indicating that the maximum number of unauthenticated (or weakly authenticated) location updates requests have been received and processed. Upon determination that the location update procedure has failed, e.g., upon expiration of a wait timer or reception of a negative location update response, the dormant end node returns to an active mode and undertakes a variety of control operations, e.g., authentication, authorization, registration, address allocation and/or agent allocation. Following any required control operations, the end node may, and in some embodiments does, transition back into the dormant mode of operation.

Variations

In some embodiments of the present invention, communications between nodes is based all, or in part, on the Internet Protocol (IP). Thus, communication of both data and/or control signaling between the network nodes may use IP packets, e.g., datagrams. In embodiments of the present invention that utilize IP packets, said IP packets may be delivered to the intended destination nodes using either unicast or multicast addressing and delivery mechanisms. The use of IP multicast is particular useful when the same information is sent from one node to a plurality of other nodes. In some embodiments of the present invention, IP multicast is used for delivery of page request signals sent from an APA that target a plurality of nodes, e.g., a set of access nodes or LPAs. In cases where the same information, e.g., packet payload data, is sent to a plurality of targeted nodes using unicast delivery, a separate IP packet with a copy of the information is sent by the source node to each targeted node. Alternatively, when the same information is sent to a plurality of targeted nodes using multicast delivery, a single IP packet with the information is sent by the source node and network nodes replicate the packet as required for delivery to each targeted node. Thus, IP multicast provides a more efficient method of delivering information from a source node to a group of destination nodes.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with code division multiple access (CDMA), orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of updating location information indicating the location of a mobile node, the method comprising:
    operating a location update agent in a first node to receive a signal including a mobile node identifier identifying said mobile node;
    operating the location update agent to send a location update signal directed to said mobile node;
    operating the location update agent to receive a location update response message; and
    operating the location update agent to send an acknowledgment to said mobile node, said acknowledgement being transmitted according to a preselected transmission relationship with said received signal including a mobile node identifier, said preselected transmission relationship being a fixed timing relationship, said acknowledgment being transmitted a fixed time from the time said received signal is received.

2. The method of claim 1, wherein sending a location update signal includes communicating said signal over a different communication path than a communications path from which said signal including a mobile node identifier was received.

3. The method of claim 1,
    wherein the mobile node identifier is an IP address corresponding to the mobile node; and
    wherein the location update signal is an IP message having a destination IP address which is the same as the mobile node identifier.

4. The method of claim 3, wherein operating said location update agent to send a location update signal includes:
    incorporating mobile node location information in said location update signal.

5. The method of claim 1, further comprising:
    operating an additional node including a tracking agent to receive said location update signal directed to said mobile node, said additional node being on a communications path over which said location update signal is directed.

6. The method of claim 5, further comprising:
operating said tracking agent to update stored mobile node location information using information obtained from said location update signal.

7. The method of claim 6, wherein said additional node responds to said received location update signal by sending a location update response message to at least one of said location update agent and said mobile node.

8. The method of claim 7, wherein said location update response message is transmitted over a different communications path than said location update signal.

9. The method of claim 5, wherein said location update signal is addressed to said mobile node.

10. The method of claim 5, wherein said location update signal is an Internet Protocol message addressed to said mobile node.

11. The method of claim 10, further comprising:
operating an intermediate node to route said location update signal between said first node and said additional node.

12. The method of claim 11, wherein said intermediate node includes a Mobile IP home agent which is responsible for redirecting packets addressed to said mobile node.

13. The method of claim 12, wherein said additional node includes a Mobile IP foreign agent in addition to said tracking agent.

14. The method of claim 1, wherein said location update agent is located in a base station.

15. The method of claim 1,
wherein the mobile node identifier is a hardware identifier; and
wherein the location update signal is an IP message having a destination address which is a function of said hardware identifier.

16. A method of updating location information indicating the location of a mobile node, the method comprising:
operating a location update agent in a first node to receive a signal including a mobile node identifier identifying said mobile node;
operating the location update agent to send a location update signal directed to said mobile node;
operating the location update agent to receive a location update response message;
operating the location update agent to send an acknowledgment to said mobile node, said acknowledgement being transmitted according to a preselected transmission relationship with said received signal including a mobile node identifier, said preselected transmission relationship being a fixed timing relationship, said acknowledgment being transmitted a fixed time from the time said received signal is received; and
wherein operating the location update agent to send an acknowledgment to said mobile node includes transmitting said acknowledgement signal over a wireless communications link.

17. A method of updating location information indicating the location of a mobile node, the method comprising:
operating a location update agent in a first node to receive a signal including a mobile node identifier identifying said mobile node;
operating the location update agent in the first node to send a location update signal directed to said mobile node;
operating an additional node including a tracking agent to receive said location update signal directed to said mobile node, said additional node being on a communications path over which said location update signal is directed, said location update signal is an Internet Protocol message addressed to said mobile node; and
wherein operating an additional node including a tracking agent to receive said location update signal includes:
operating said tracking agent to examine at least one field in each of a plurality of Internet Protocol messages; and
intercepting Internet Protocol messages having a value in said examined field indicative of a location update message.

18. A method of updating location information indicating the location of a mobile node, the method comprising:
operating a location update agent in a first node to receive a signal including a mobile node identifier identifying said mobile node;
operating the location update agent to send a location update signal directed to said mobile node;
wherein the mobile node identifier is a hardware identifier;
wherein the location update signal is an IP message having a destination address which is a function of said hardware identifier; and
wherein said destination address has a one to one mapping with said hardware identifier.

19. A communications node comprising:
a wireless receiver for receiving a signal including a mobile node identifier identifying a mobile node;
a network interface connection; and
a location update agent for sending a location update signal directed to said mobile node through said network connection interface in response to said receiver receiving said signal and for sending, over a wireless communications connection, an acknowledgment to said mobile node according to a preselected transmission relationship with said received location update signal including a mobile node identifier, said preselected transmission relationship being a fixed timing relationship, said acknowledgment being transmitted a fixed time from the time said received signal is received.

20. The communications node of claim 19,
wherein the mobile node identifier is an IP address corresponding to the mobile node; and
wherein the location update signal is an IP message having a destination address which is the same as the mobile node identifier.

21. A communications node, comprising:
wireless receiver means for receiving a signal from a mobile node, said signal being a location update signal including a mobile node identifier;
location update means for processing the received location update signal including a mobile node identifier identifying said mobile node and for sending a location update signal directed to said mobile node in response to the received location update signal;
network interface means for receiving a location update response message; and
transmitter means for transmitting over a wireless communications connection an acknowledgment to said mobile node, according to a preselected transmission relationship with said received signal including a mobile node identifier, said preselected transmission relationship being a fixed timing relationship, said acknowledgment being transmitted a fixed time from the time said signal is received.

22. The communications node of claim 21,
wherein the mobile node identifier is an IP address corresponding to the mobile node; and wherein the location update signal is an IP message having a destination IP address which is the same as the mobile node identifier.

23. The communications node of claim 21,
wherein said communications node is a base station.

24. A machine readable medium embodying machine executable instructions for controlling a communications node to implement a communications method, the communications method comprising:
controlling a location update agent in the communications node to receive a signal including a mobile node identifier identifying a mobile node;
controlling the location update agent to send a location update signal directed to said mobile node;
controlling the location update agent to receive a location update response message; and
controlling the location update agent to send an acknowledgment to said mobile node, said acknowledgement being transmitted according to a preselected transmission relationship with said received signal including a mobile node identifier, said preselected transmission relationship being a fixed timing relationship, said acknowledgment being transmitted a fixed time from the time said received signal is received.

25. The machine readable medium of claim 24,
wherein the mobile node identifier is an IP address corresponding to the mobile node; and
wherein the location update signal is an IP message having a destination IP address which is the same as the mobile node identifier.

26. A communications system, comprising:
a first node including a location update agent including:
  i) means for receiving a signal including a mobile node identifier identifying a mobile node;
  ii) means for transmitting a location update signal directed to said mobile node; and
an additional node coupled to said first node by a communications link, said additional node including a tracking agent, said tracking agent including:
  means for receiving said location update signal directed to said mobile node, said additional node being on a communications path over which said location update signal is directed, said location update signal is an Internet Protocol message addressed to said mobile node;
  ii) means for examining at least one field in each of a plurality of Internet Protocol messages; and
  iii) means for intercepting Internet Protocol messages having a value in said examined field indicative of a location update message.

27. A machine readable medium embodying machine executable instructions for controlling a first node and an additional node to implement a method of updating location information indicating the location of a mobile node, the method comprising:
operating a location update agent in the first node to receive a signal including a mobile node identifier identifying said mobile node;
operating the location update agent in the first node to send a location update signal directed to said mobile node;
operating the additional node including a tracking agent to receive said location update signal directed to said mobile node, said additional node being on a communications path over which said location update signal is directed, said location update signal an Internet Protocol message addressed to said mobile node; and
wherein operating the additional node including a tracking agent to receive said location update signal includes:
operating said tracking agent to examine at least one field in each of a plurality of Internet Protocol messages; and
intercepting Internet Protocol messages having a value in said examined field indicative of a location update message.

28. A communications node, comprising:
location update means for receiving a signal including a mobile node identifier identifying said mobile node and for sending a location update signal directed to said mobile node; and
a wireless transmitter for transmitting a location update acknowledgment signal to said mobile node over a wireless communications link;
wherein the mobile node identifier is a hardware identifier;
wherein the location update signal is an IP message having a destination address which is a function of said hardware identifier; and
wherein said destination address has a one to one mapping with said hardware identifier.

29. A machine readable medium embodying machine executable instructions for controlling a first node to implement a communications method, the method comprising:
controlling a location update agent in the first node to receive a signal including a mobile node identifier identifying said mobile node;
controlling the location update agent to send a location update signal directed to said mobile node;
wherein the mobile node identifier is a hardware identifier;
wherein the location update signal is an IP message having a destination address which is a function of said hardware identifier; and
wherein said destination address has a one to one mapping with said hardware identifier.

30. A device comprising a processor configured to control a communications node to implement a communications method, the communications method comprising:
controlling a location update agent in the communications node to receive a signal including a mobile node identifier identifying a mobile node;
controlling the location update agent to send a location update signal directed to said mobile node;
controlling the location update agent to receive a location update response message; and
controlling the location update agent to send an acknowledgment to said mobile node, said acknowledgement being transmitted according to a preselected transmission relationship with said received signal including a mobile node identifier, said preselected transmission relationship being a fixed timing relationship, said acknowledgment being transmitted a fixed time from the time said received signal is received.

31. The device of claim 30,
wherein the mobile node identifier is an IP address corresponding to the mobile node; and
wherein the location update signal is an IP message having a destination IP address which is the same as the mobile node identifier.

* * * * *